(12) United States Patent
Oouchi et al.

(10) Patent No.: US 8,320,384 B2
(45) Date of Patent: *Nov. 27, 2012

(54) PACKET FORWARDING APPARATUS SUITABLE FOR REAL TIME PACKETS

(75) Inventors: Ken Oouchi, Yokohama (JP); Hiroaki Miyata, Yokohama (JP); Yasuo Kogure, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 144 days.

This patent is subject to a terminal disclaimer.

(21) Appl. No.: 11/954,132

(22) Filed: Dec. 11, 2007

(65) Prior Publication Data

US 2008/0175251 A1 Jul. 24, 2008

(30) Foreign Application Priority Data

Jan. 18, 2007 (JP) .................................. 2007-009207

(51) Int. Cl.
H04L 12/28 (2006.01)
(52) U.S. Cl. .................................................. 370/395.31
(58) Field of Classification Search ................ 370/395.3
See application file for complete search history.

(56) References Cited

U.S. PATENT DOCUMENTS

| 6,553,031 B1 * | 4/2003 | Nakamura et al. ............ 370/392 |
| 7,020,707 B2 * | 3/2006 | Sternagle ...................... 709/230 |
| 7,095,716 B1 * | 8/2006 | Ke et al. ........................ 370/230 |
| 7,103,055 B2 * | 9/2006 | Kadambi et al. ............... 370/409 |
| 7,185,094 B2 * | 2/2007 | Marquette et al. ............ 709/225 |
| 7,283,519 B2 * | 10/2007 | Girard ........................... 370/353 |
| 7,936,750 B2 * | 5/2011 | Tsuzuki et al. ................ 370/389 |
| 2003/0012202 A1 * | 1/2003 | Fukutomi .................. 370/395.52 |
| 2006/0209807 A1 * | 9/2006 | Lor et al. ....................... 370/352 |

FOREIGN PATENT DOCUMENTS

| JP | 2004-304371 | 10/2004 |
| JP | 2005-217715 | 8/2005 |

OTHER PUBLICATIONS

Rosenberg et al, "SIP: Session Initiation Protocol", The Internet Society, RFC 3261, Jun. 2002, 210 pages.
Schulzrinne et al, "RIP: A Transport Protocol for Real-Time Application", Network Working Group, RFC 1889, Jan. 1996, 59 pages.
Handley et al, "SDP: Session Description Protocol", The Internet Society, RFC 2327, Apr. 1998, 33 pages.
McPherson et al, "VLAN Aggregation for Efficient IP Address Allocation", The Internet Society, RFC 3069, Feb. 2001, 6 pages.

* cited by examiner

*Primary Examiner* — Ayaz Sheikh
*Assistant Examiner* — Hai-Chang Hsiung
(74) *Attorney, Agent, or Firm* — Mattingly & Malur, PC

(57) ABSTRACT

In a packet forwarding apparatus including first line interfaces accommodating user terminals, a second line interface connected to a communication node on a session management apparatus side, and a protocol processing unit for updating a connection management table and a header information table when a specific session control packet is received from one of the first line interfaces. Upon receiving a real-time packet from one of the first line interfaces, if a table entry corresponding to the header information of the received packet has been registered in the connection management table, the control unit routes the received packet to one of the first line interfaces after rewriting its header information based on the header information table, and if the table entry has not been registered, the control unit routes the received packet as it is to the second line interface.

5 Claims, 20 Drawing Sheets

SESSION CONTROL PACKET

CONNECTION MANAGEMENT TABLE 20

FIG. 6A

| # | ORIGINATING TERMINAL INFORMATION (21) | | | | | TERMINATING TERMINAL INFORMATION (22) | | | | |
|---|---|---|---|---|---|---|---|---|---|---|
| | TERMINAL ID | IP ADDRESS | PORT NUMBER | DEVICE PORT NO. (214) | | IP ADDRESS | PORT NUMBER | DEVICE PORT NO. (223) | | |
| | | | | LINE NO. | VLAN-ID | | | LINE NO. | VLAN-ID | |
| 1 | UserB@aaa.com | 192.168.0.1 | 50050 | 1 | 10 | | | | | EN1 |
| 2 | | | | | | | | | | |

| # | ORIGINATING TERMINAL INFORMATION (21) | | | | | TERMINATING TERMINAL INFORMATION (22) | | | | |
|---|---|---|---|---|---|---|---|---|---|---|
| | TERMINAL ID | IP ADDRESS | PORT NUMBER | DEVICE PORT NO. (214) | | IP ADDRESS | PORT NUMBER | DEVICE PORT NO. (223) | | |
| | | | | LINE NO. | VLAN-ID | | | LINE NO. | VLAN-ID | |
| 1 | UserB@aaa.com | 192.168.0.1 | 50050 | 1 | 10 | 192.168.1.1 | 50070 | 2 | 11 | EN1 |
| 2 | | | | | | | | | | |

HEADER INFORMATION TABLE 30

| LINE NO. | VLAN-ID | MAC ADDRESS | RTP IP ADDRESS |
|---|---|---|---|
| 1 | 1 | | |
| | | | |
| | 10 | 00-00-00-00-00-01 | 192.168.0.1 |
| | | | |
| | m | | |
| 2 | 1 | | |
| | | | |
| | 11 | 00-00-00-00-01-01 | 192.168.1.1 |
| | | | |
| | m | | |
| | | | |
| k | 1 | | |
| | | | |
| | 10 | 00-00-00-00-11-11 | |
| | 11 | 00-00-00-00-11-11 | |
| | | | |
| | m | | |
| | | | |
| n | | | |

FIG. 9

INVITE PACKET M1

H2/H3

DA : 138.85.28.1 #SIP SERVER
SA : 192.168.0.1 #UserB
UDP dst port : 5060
UDP src port : 5060
················· SIP message ···················

51 — INVITE sip:UserE@aaa.com SIP/2.0
Via: SIP/2.0/UDP/ userb.aaa.com : 5060
From: Laura <SIP : UserB@aaa.com>
To: Bob <SIP : UserE@aaa.com>
Call-ID: 12345678@userb.aaa.com
52 — CSeq: 1 INVITE
Contact : Laura <SIP : UserB@userb.aaa.com>
Content-type: application/sdp
Content-length :

v=0
o=Laura 289123456 289123456 IN IP4 userb.aaa.com
53 — s=Let us talk a while
c=IN IP4 192.168.0.1
t=0 0
m=audio 50050 RTP/AVP 0

FIG. 10

INVITE PACKET M4

```
DA : 192.168.1.1  # UserE
SA : 138.85.28.1    #SIP SERVER
UDP dst port : 5060
UDP src port : 5060
·················· SIP message ·····················
INVITE sip:UserE@aaa.com SIP/2.0
Via :  SIP/2.0/UDP/ aaa.com
Via :  SIP/2.0/UDP/ userb.aaa.com : 5060
From :  Laura <SIP : UserB@aaa.com>
To :  Bob <SIP : UserE@aaa.com>
Call-ID :  12345678@userb.aaa.com
Cseq :  1 INVITE
Contact : Laura <SIP : UserB@userb.aaa.com>
Content-type :  application/sdp
Content-length :

v=0
o=Laura 289123456 289123456 IN IP4 userb.aaa.com
s=Let us talk a while
c=IN IP4 192.168.0.1
t=0 0
m=audio 50050 RTP/AVP 0
```

FIG. 11

200 OK PACKET M7

DA : 138.85.28.1  #SIP SERVER
SA : 192.168.1.1  #UserE
UDP dst port : 5060
UDP src port : 5060
·················· SIP message ····················
SIP/2.0 200 OK
Via : SIP/2.0/UDP/ aaa.com
Via : SIP/2.0/UDP/ userb.aaa.com : 5060
From : Laura <SIP : UserB@aaa.com>
To : Bob <SIP : UserE@aaa.com>
Call-ID : 12345678@userb.aaa.com
Cseq : 1 INVITE
Contact : BOb <SIP : UserE@userc.aaa.com>
Content-type : application/sdp
Content-length :

v=0
o=Bob 289123456 289123456 IN IP4 userc.aaa.com
s=Let us talk for while
c=IN IP4 192.168.1.1
t=0 0
m=audio 50070 RTP/AVP 0

FIG. 12

200 OK PACKET M10

```
DA : 192.168.0.1    #UserB
SA : 138.85.28.1    # SIP SERVER
UDP dst port : 5060
UDP src port : 5060
................ SIP message ....................
SIP/2.0 200 OK
Via : SIP/2.0/UDP/ userb.aaa.com : 5060
From : Laura <SIP : UserB@aaa.com>
To : Bob <SIP : UserE@aaa.com>
Call-ID : 12345678@userb.aaa.com
Cseq : 1 INVITE
Contact : BOb <SIP : UserE@userc.aaa.com>
Content-type : application/sdp
Content-length :

v=0
o=Bob 289123456 289123456 IN IP4 userc.aaa.com
s=Let us talk a while
c=IN IP4 192.168.1.1
t=0 0
m=audio 50070 RTP/AVP 0
```

FIG. 13

ACK PACKET M13

```
DA : 138.85.28.1   # SIP SERVER
SA : 192.168.0.1  # UserB
UDP dst port : 5060
UDP src port : 5060
............... SIP message ...............
ACK SIP : UserE@192.168.1.1 SIP/2.0
Via : SIP/2.0/UDP/ userb.aaa.com : 5060
From : Laura <SIP : UserB@aaa.com>
To : Bob <SIP : UserE@aaa.com>
Call-ID : 12345678@userb.aaa.com
Cseq : 1 ACK
Contact : Laura <SIP : UserB@userb.aaa.com>
Content-type : application/sdp
Content-length :
```

FIG. 14

ACK PACKET M16

```
DA : 192.168.1.1  # UserE
SA : 138.85.28.1   # SIP SERVER
UDP dst port : 5060
UDP src port : 5060
............... SIP message ...............
ACK SIP : UserE@192.168.1.1 SIP/2.0
Via : SIP/2.0/UDP/ aaa.com
Via : SIP/2.0/UDP/ userb.aaa.com : 5060
From : Laura <SIP : UserB@aaa.com>
To : Bob <SIP : UserE@aaa.com>
Call-ID : 12345678@userb.aaa.com
Cseq : 1 ACK
Contact : Laura <SIP : UserB@userb.aaa.com>
Content-type : application/sdp
Content-length :
```

FIG. 16

RTP PACKET D1

```
DA : 192.168.1.1  # UserE
SA : 192.168.0.1  # UserB
UDP dst port : 50070
UDP src port : 50050
·················· SIP message ·····················
THE REST IS OMITTED
```

FIG. 17

RTP PACKET D3

```
DA : 192.168.0.1   # UserB
SA : 192.168.1.1   # UserE
UDP dst port : 50050
UDP src port : 50070
·················· SIP message ·····················
THE REST IS OMITTED
```

FIG. 19

BYE PACKET M19

```
DA : 138.85.28.1   # SIP SERVER
SA : 192.168.0.1  # UserB
UDP dst port : 5060
UDP src port : 5060
················ SIP message ·····················
BYE SIP : UserE@192.168.1.1 SIP/2.0
Via : SIP/2.0/UDP/ userb.aaa.com : 5060
From : Laura <SIP : UserB@aaa.com>
To : Bob <SIP : UserE@aaa.com>
Call-ID : 12345678@userb.aaa.com
Cseq : 2 BYE
Contact : Laura <SIP : UserB@userb.aaa.com>
```

FIG. 20

BYE PACKET M22

```
DA : 192.168.1.1  # UserE
SA : 138.85.28.1   # SIP SERVER
UDP dst port : 5060
UDP src port : 5060
················ SIP message ·····················
BYE SIP : UserE@192.168.1.1 SIP/2.0
Via : SIP/2.0/UDP/aaa.com
Via : SIP/2.0/UDP/ userb.aaa.com : 5060
From : Laura <SIP : UserB@aaa.com>
To : Bob <SIP : UserE@aaa.com>
Call-ID : 12345678@userb.aaa.com
Cseq : 2 BYE
Contact : Laura <SIP : UserB@userb.aaa.com>
```

FIG. 21

200 OK PACKET M25

```
DA : 138.85.28.1    #SIP SERVER
SA : 192.168.1.1    #UserE
UDP dst port : 5060
UDP src port : 5060
............... SIP message ...............
SIP/2.0 200 OK
Via :  SIP/2.0/UDP/ aaa.com
Via :  SIP/2.0/UDP/ userb.aaa.com : 5060
From :  Laura <SIP : UserB@aaa.com>
To :  Bob <SIP : UserE@aaa.com>
Call-ID :  12345678@userb.aaa.com
Cseq :  2 BYE
Contact : Bob<SIP : UserE@userc.aaa.com>
```

FIG. 22

200 OK PACKET M28

```
DA : 192.168.0.1    #UserB
SA : 138.85.28.1    # SIP SERVER
UDP dst port : 5060
UDP src port : 5060
............... SIP message ...............
SIP/2.0 200 OK
Via :  SIP/2.0/UDP/ userb.aaa.com : 5060
From :  Laura <SIP : UserB@aaa.com>
To :  Bob <SIP : UserE@aaa.com>
Call-ID :  12345678@userb.aaa.com
Cseq :  2 BYE
Contact : Bob<SIP : UserE@userc.aaa.com>
```

PACKET FORWARDING APPARATUS SUITABLE FOR REAL TIME PACKETS

CLAIM OF PRIORITY

The present application claims priority from Japanese patent application serial No. 2007-009207, filed on Jan. 18, 2007, the content of which is hereby incorporated by reference into this application.

BACKGROUND OF THE INVENTION

1. Field of the Invention

The present invention relates to a packet forwarding apparatus, and more particularly, to a packet forwarding apparatus which is connected between a plurality of terminals and a session management apparatus and effectively forwards real-time packets.

2. Description of the Related Art

In recent years, as a voice communication technology, VoIP (Voice over IP) utilizing the Internet has been put to practical use. In VoIP, a virtual communication path (session) is established between the terminals prior to packet communication, and IP packets including voice data are transferred through the communication path. As session control protocols in IP multimedia communication, the IETF (Internet Engineering Task Force) specifies SIP (Session Initiation Protocol) RFC3261 suitable for VoIP and RTP (Real-time Transport Protocol) RFC1889 suitable for transmission of coded voice data.

SIP is a text-based application protocol utilizing a transport mechanism such as TCP (Transmission Control Protocol) and UDP (User Datagram Protocol), and a SIP message is comprised of a header for carrying request information or response information, and a message body for describing the contents of a session. For describing a session in the message body, for example, SDP (Session Description Protocol) RFC2327 is applied, and a correspondent terminal is identified by an SIP URI (Uniform Resource Identifier). As operation modes of an SIP server, a proxy mode and a redirect mode are known. In the proxy mode, the SIP server mediates a request for session establishment (call setup) between terminals. In the redirect mode, an originating terminal acquires information on a terminating terminal from the SIP server to directly communicate with the terminating terminal.

On the other hand, a VLAN (Virtual Local Area Network) is used in a enterprise local area network. The VLAN connects and groups together a plurality of terminals via a virtual LAN, independently of the physical connection configuration of the network. For example, in a network configuration in which a plurality of terminals are connected to an ISP (Internet Service Provider) network via an L2SW (Layer 2 Switch) which is a layer-2 packet forwarding apparatus and an L3SW (Layer 3 Switch) represented by a router, when a plurality of terminals connected to the L2SW form a plurality of VLANs, communication packets between VLAN segments are forwarded to the L3SW through the L2SW. Each communication packet is sent back from the L3SW to the L2SW after rewriting of the VLAN-ID by the L3SW, and forwarded to the connection line of a destination terminal.

In recent years, in order to ensure the confidentiality between terminals, VLAN aggregation (RFC3069) has been proposed. In the VLAN aggregation, a VLAN is assigned to each terminal connected to the L2SW and a unified VLAN is formed between the L2SW and the L3SW. Since a plurality of terminals connected to the same network have different VLAN-IDs in the VLAN aggregation, in the same way as with the above-described communication packet between VLAN segments, communication packets between terminals are forwarded to the L3SW through the L2SW, sent back from the L3SW to the L2SW after rewriting of the VLAN-ID by the L3SW, and forwarded to the connection line of a destination terminal.

As a related art with respect to sending back of packets by an L2SW accommodating a plurality of VLANs, Japanese Unexamined Patent Application Publication No. 2005-217715 proposes an L2SW that learns and stores the correspondence relationship between the IP address or MAC address of a terminal under control and a port number when an address resolution protocol ARP (or neighbor discovery protocol NDP) packet, which includes the address of the terminal as a destination address or a source address, or a response packet to the request was received. When a packet to be transferred between different segments is received, the L2SW directly forwards the received packet across the segments based on the learning result, without passing it through a higher-level router.

Further, Japanese Unexamined Patent Application Publication No. 2004-304371 proposes an L2SW connected to a plurality of hot standby routers (virtual routers) and a plurality of LAN segments. Upon receiving data to be transferred between first and second hosts belonging to different LAN segments, the L2SW converts the address of the received data by referring to a flow table and sends the received data to a destination host. In this case, the flow table stores the IP address of one of the first and second hosts as a source address, and the MAC address and IP address of the other host as a destination address. The L2SW learns the relationship between a source address and a destination address by passing the first received data through the virtual router, stores the learning result, and rewrites the destination MAC address of data received subsequently, using the MAC address indicated in a table entry corresponding to the source IP address of the received data.

In the case of implementing voice communication over an IP network such as the Internet, voice data is transferred in the form of an IP packet to the IP network. Since the IP network is shared by a number of users, network congestion retards the transfer of voice packets on the IP network. Particularly in an L2SW that accommodates a plurality of access lines forming VLANs or in an L2SW to which the VLAN aggregation is applied, voice delay is increased much more because of the travel between the L2SW and the L3SW if voice packets between different VLAN segments have to be sent back by the higher-level L3SW.

Since the L2SW disclosed in Japanese Unexamined Patent Application Publication No. 2005-217715 forwards all packets having address-resolved destination addresses to destination terminals without passing them to the higher-level router, the L3SW side cannot confirm actual traffic. Accordingly, in the case where the L2SW is applied to a network configuration in which a session management server connected to the L3SW side collects account information on voice communication for each session, there is a problem that the session management server cannot collect account information. Similarly, the L2SW disclosed in Japanese Unexamined Patent Application Publication No. 2004-304371 forwards all data except the first received data to destination terminals without passing them to the higher-level router. Therefore, there is the same problem as in Japanese Unexamined Patent Application Publication No. 2005-217715.

SUMMARY OF THE INVENTION

It is an object of the present invention to provide a packet forwarding apparatus (L2SW) suitable for forwarding real-time packets to be transmitted after establishing a session between terminals such as voice packets.

It is another object of the invention to provide a packet forwarding apparatus particularly suitable for forwarding real-time packets between different VLAN segments.

In order to attain the above objects, a packet forwarding apparatus according to the invention comprises a plurality of first line interface units for accommodating access lines each connected to at least one user terminal, a second line interface unit for connecting to a communication node on a network including a session management apparatus, and a protocol processing unit for routing received packets among the first and second line interface units. In the packet forwarding apparatus, the protocol processing unit includes a connection management table in which a plurality of table entries each indicating a correspondence relationship between originating terminal information and terminating terminal information for each session are registered, a header information table in which a plurality of table entries each indicating, in association with a line number, a combination of a VLAN-ID, a MAC address, and an IP address are registered, and a control unit.

When a specific session control packet to be forwarded to the session management apparatus is received from one of the first line interface units, the control unit updates the connection management table and the header information table based on information items extracted from the control packet. When a real-time packet is received from one of the first line interface units, the control unit compares header information of the received packet with the originating terminal information and the terminating terminal information registered in the connection management table, so that the control unit routes the received packet to the first line interface unit corresponding to a destination terminal after rewriting the header information of the received packet based on the header information table if a table entry corresponding to the header information has been registered in the connection management table. If the table entry corresponding to the header information has not been registered in the connection management table, the control unit routes the received packet to the second line interface unit.

More specifically, when a session establishment request packet is received from one of the first line interface units, the control unit adds to the connection management table a new table entry including originating terminal information extracted from a header and a message content of the received packet, and adds to the header information table a new table entry for an originating terminal, which indicates in association with an input line number of the received packet, a VLAN-ID, a source MAC address, and a source IP address extracted from the header of the received packet. Further, when a response packet to the session establishment request packet is received from one of the first line interface units, the control unit registers terminating terminal information extracted from a header of the response packet into the new table entry of the connection management table, and adds to the header information table a new table entry for a terminating terminal, which indicates in association with an input line number of the response packet, a VLAN-ID, a source MAC address, and a source IP address extracted from the header of the received packet.

In the packet forwarding apparatus according to the invention, when a session disconnection request packet is received through one of the first line interface units, the control unit deletes from the connection management table a table entry corresponding to a session for which disconnection was requested, and deletes from the header information table a table entry for an originating terminal and a table entry for a terminating terminal, each of which is identified by header information of the disconnection request packet.

According to one aspect of the invention, the protocol processing unit includes a routing unit for routing received packets among the first and second line interface units. The routing unit supplies the specific session control packets and the real-time packets received from the first line interface unit to the control unit, and routes session control packets and real-time packets outputted from the control unit in accordance with respective header information.

According to another aspect of the invention, the routing unit supplies session control packets and real-time packets received from the first and second line interface units to the control unit, and the control unit selects the specific session control packets from among the session control packets received from the routing unit to update the connection management table and the header information table.

According to the invention, when voice communication is performed between terminals accommodated by the packet forwarding apparatus, it becomes possible to reduce voice delay by forwarding real-time packets from the packet forwarding apparatus to a destination terminal without passing them to a higher-level communication node.

Further, the packet forwarding apparatus according to the invention stores, in the process of session establishment, the correspondence relationship between originating terminal information and terminating terminal information in the connection management table, forwards only real-time packets communicated between terminals for which a session has been registered in the connection management table to a destination terminal, and forwards the other packets to the higher-level communication node. Therefore, there is no possibility that the packet forwarding apparatus incorrectly sends back unspecified packets to the destination terminal.

According to the invention, since all session control packets necessary for a session management server are forwarded from the packet forwarding apparatus to the session management server, the session management server can collect information without a hitch. Further, when the session is disconnected, table entries that have become unnecessary are deleted from the connection management table and the header information table. Therefore, there is no possibility that the packet forwarding apparatus incorrectly sends back a received packet to a destination terminal based on these tables, without passing it to the higher-level communication node.

BRIEF DESCRIPTION OF THE DRAWINGS

FIGS. 6A and 6B are illustrations showing an example of a connection management table 20;

FIG. 7 is an illustration showing an example of a header information table 30;

FIG. 9 is an illustration showing an example of an INVITE packet M1 in FIG. 8;

FIG. 10 is an illustration showing an example of an INVITE packet M4 in FIG. 8;

FIG. 11 is an illustration showing an example of a 200 OK packet M7 in FIG. 8;

FIG. 12 is an illustration showing an example of a 200 OK packet M10 in FIG. 8;

FIG. 13 is an illustration showing an example of an ACK packet M13 in FIG. 8;

FIG. 14 is an illustration showing an example of an ACK packet M16 in FIG. 8;

FIG. 16 is an illustration showing an example of an RTP packet D1 in FIG. 15;

FIG. 17 is an illustration showing an example of an RTP packet D3 in FIG. 15;

FIG. 19 is an illustration showing an example of a BYE packet M19 in FIG. 18;

FIG. 20 is an illustration showing an example of a BYE packet M22 in FIG. 18;

FIG. 21 is an illustration showing an example of a 200 OK packet M25 in FIG. 18;

FIG. 22 is an illustration showing an example of a 200 OK packet M28 in FIG. 18;

DETAILED DESCRIPTION OF THE PREFERRED EMBODIMENTS

Hereinafter, an embodiment of the present invention will be described with reference to the accompanying drawings.

Figure 1:
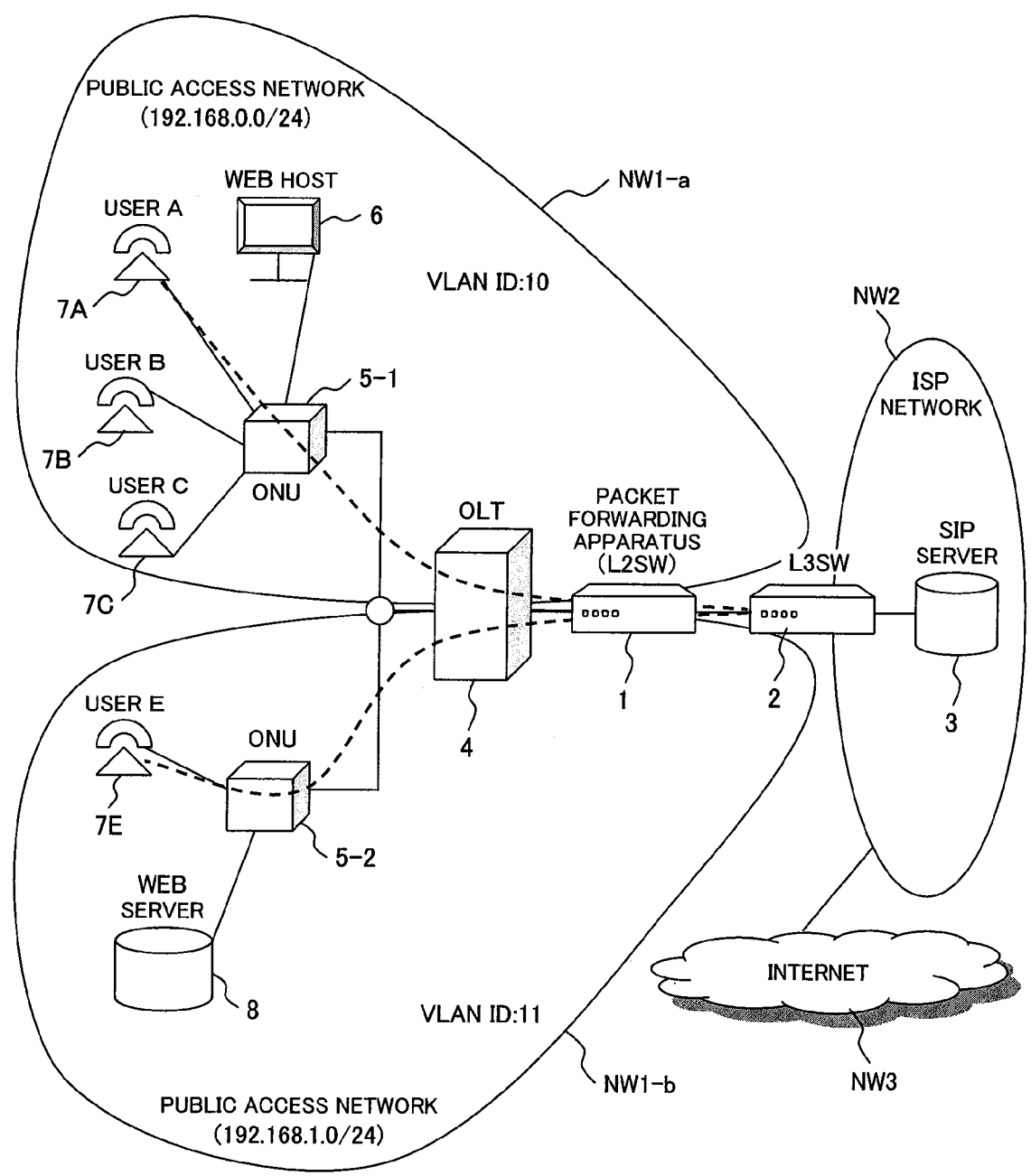
FIG. 1 is an illustration showing an example of a network to which a packet forwarding apparatus (L2SW) 1 according to the invention is applied.

FIG. 1 shows an example of a network to which a packet forwarding apparatus (L2SW) 1 according to the invention is applied.

The packet forwarding apparatus 1 is an L2SW which performs routing of each received packet in accordance with its layer 2 header information. The packet forwarding apparatus 1 is disposed in a wide-area L2 switch network as a public access network NW1 (NW1-*a* and NW1-*b*), and is connected to an ISP network NW2 through an L3SW 2. The L3SW 2 is connected to a session management apparatus (SIP server) 3, and the ISP network NW2 is connected to the Internet NW3.

In the public access network NW1, the packet forwarding apparatus (L2SW) 1 accommodates, through at least one access line, a plurality of communication apparatuses, e.g., user terminals 6, 7 (7A, 7B, ... ) and a WEB server 8. In the example of FIG. 1, the access line is formed of a PON (Passive Optical Network) composed of an office side connection apparatus OLT (Optical Line Terminal) 4 and a plurality of subscriber connection apparatuses ONU (Optical Network Unit) 5 (5-1, 5-2, ...) connected to the OLT through an optical fiber network.

In the following description, the user terminal 6 which uses the WEB server 8 is referred to as a WEB host, and the user terminals 7 (7A, 7B, ... ) which use the SIP server 3 are referred to as SIP terminals. In FIG. 1, the SIP terminals 7A, 7B, and 7C connected to the ONU 5-1 belong to a first VLAN NW1-*a* having a VLAN-ID "10", and the SIP terminal 7E connected to the ONU 5-2 belongs to a second VLAN NW1-*b* having a VLAN-ID "11".

As will be detailed later, the packet forwarding apparatus (L2SW) 1 has the function of snooping SIP control packets. In the process where an SIP terminal establishes a session with another SIP terminal through the SIP server 3, the packet forwarding apparatus (L2SW) 1 stores in a connection management table the correspondence relationship between originating terminal information and terminating terminal information extracted from a SIP control packet received, and stores in a header information table a VLAN-ID and address information in association with the input line number of the received SIP control packet. Upon receiving a real-time packet (RTP packet) communicated between a pair of SIP terminals after establishing a session, the packet forwarding apparatus (L2SW) 1 refers to these tables to convert the header information of the received RTP packet and forwards the received packet to a destination terminal without passing it through the SIP server 3.

For example, in the case where VoIP communication is performed between the SIP terminal 7A having the identification name of "User A" which belongs to the first VLAN NW1-*a* and the SIP terminal 7C having the identification name of "User C" which belongs to the same first VLAN NW1-*a*, an RTP packet transmitted by the SIP terminal 7A (7C) after establishing a session is communicated without passing through the SIP server 3, by forwarding it to the destination terminal 7C (7A) by the packet forwarding apparatus (L2SW) 1.

Similarly, in the case where VoIP communication is performed between the SIP terminal 7A having the identification name of "User A" which belongs to the first VLAN NW1-*a* and the SIP terminal 7E having the identification name of "User E" which belongs to the second VLAN NW1-*b*, an RTP packet transmitted by the SIP terminal 7A (7E) after establishing a session is communicated without passing through the SIP server 3, by forwarding it to the destination terminal 7E (7A) by the packet forwarding apparatus (L2SW) 1.

Figure 2:
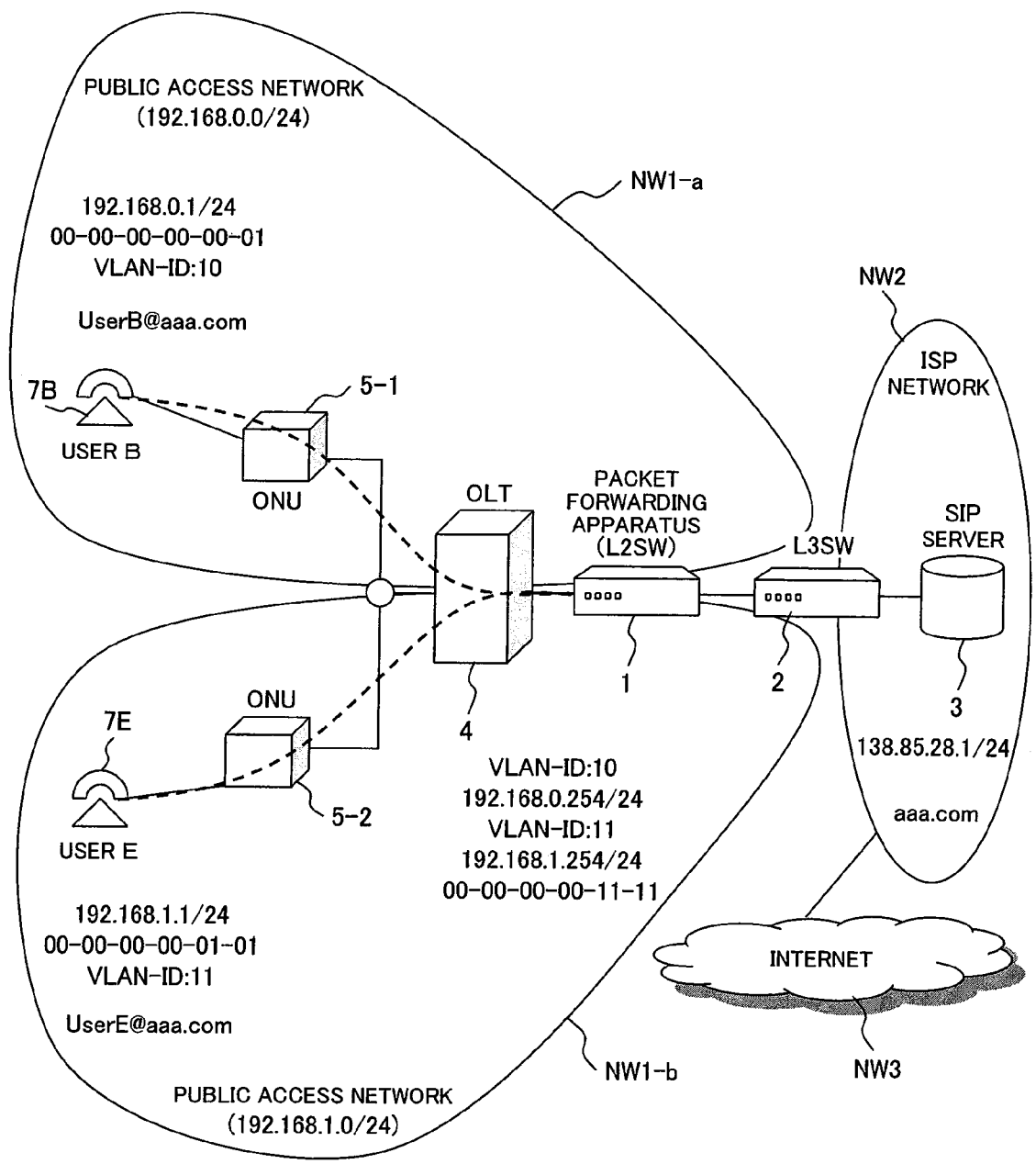
FIG. 2 is a network configuration diagram illustrating the operation of the packet forwarding apparatus (L2SW) 1 according to the invention.

Hereinafter, the operation of the packet forwarding apparatus (L2SW) 1 according to the invention will be described in detail, with reference to an example in which VoIP communication is performed between the SIP terminal 7B having the identification name of "User B" which belongs to the first VLAN NW1-*a* and the SIP terminal 7E having the identification name of "User E" which belongs to the second VLAN NW1-*b*, as shown in FIG. 2. In FIG. 2, "xxx.xxx.x.x/xx", "xx-xx-xx-xx-xx-xx", and "UserX@aaa.com" associated with the SIP terminals denote an IP address, a MAC address, and a URI (Uniform Resource Identifier), respectively.

Figure 3:
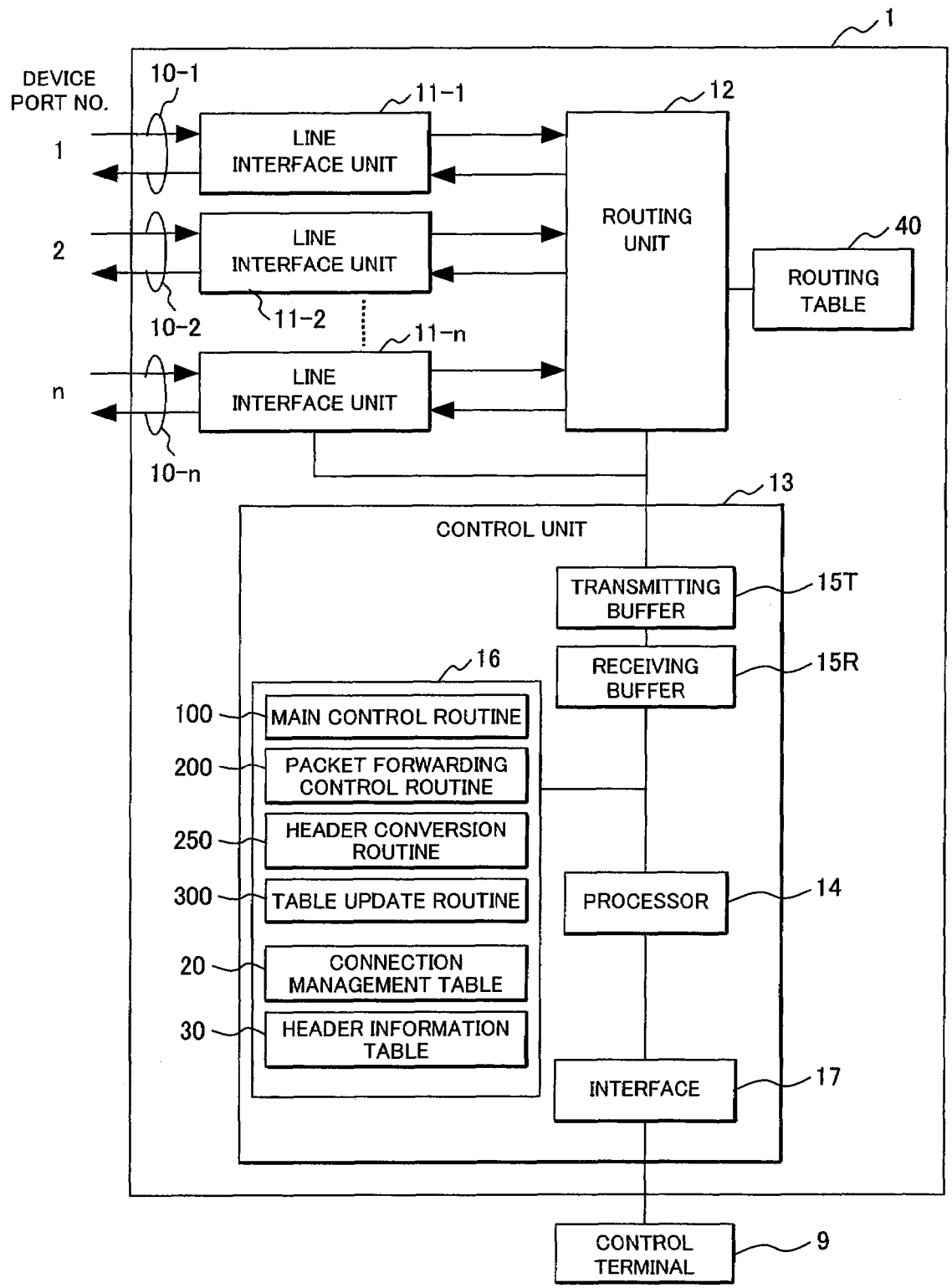
FIG. 3 is a block diagram showing an example of the packet forwarding apparatus (L2SW) 1 according to the invention.

FIG. 3 is a block diagram showing an example of the packet forwarding apparatus (L2SW) 1.

The packet forwarding apparatus 1 is comprised of line interface units 11 (11-1 to 11-*n*) connected to input/output lines 10 (10-1 to 10-*n*) respectively, a routing unit 12 connected to the line interface units 11, and a control unit 13 connected to the line interface units 11 and the routing unit 12. The control unit 13 and the routing unit 12 constitute a protocol processing unit.

The routing unit 12 routes a received packet according to a routing table 40 indicative of the correspondence relationship between the line number and the MAC address of each terminal. In this embodiment, a line interface unit accommodating an access line to which a user terminal is connected is referred to as a first line interface unit, and a line interface unit accommodating a connection line for the L3SW is referred to as a second line interface unit.

The control unit 13 is comprised of a processor 14, a transmitting buffer 15T and a receiving buffer 15R connected to the routing unit 12, a memory 16, and an interface 17 for connecting to a control terminal 9.

The memory 16 stores, as programs related to the invention and executed by the processor 14, a main control routine 100, a packet forwarding control routine 200, a header conversion routine 250, and a table update routine 300. A connection management table 20 and a header information table 30 are formed in the memory 16. The connection management table 20 stores a plurality of table entries each indicating the correspondence relationship between originating terminal information and terminating terminal information for each session, and the header information table 30 stores a plurality of table entries each indicating the MAC address, IP address, and VLAN-ID of a terminal, in association with a line number.

The routing unit 12 takes in a received packet, for example, by cyclically accessing the line interface units 11 (11-1 to 11-n). In this embodiment, the routing unit 12 judges the packet type particularly about packets received from first line interface units, and outputs session control packets each including an SIP message and RTP packets to the receiving buffer 15R, together with an input line number (device port number). The routing unit 12 forwards packets received from the second line interface unit, the other packets received from the first line interface units, and packets outputted from the processor 14 to the transmitting buffer 15T, to one of the line interfaces corresponding to a destination address (MAC address) in accordance with the routing table 40.

The processor 14 reads out a received packet from the receiving buffer 15R in accordance with the main control routine 100, determines the type of the received packet, and executes the packet forwarding control routine 200 or the table update routine 300 depending on the packet type.

If the received packet is a session control packet including an SIP message of a predetermined specific type, the processor 14 executes the table update routine 300 to output the received packet to the transmitting buffer 15T after updating the connection management table 20 and the header information table 30.

If the packet read out from the receiving buffer 15R is an RTP packet, the processor 14 executes the packet forwarding control routine 200. In the packet forwarding control routine 200, the processor 14 extracts originating terminal information and terminating terminal information from the header of the received packet, and determines whether the session of the received packet has been registered in the connection management table 20. If the session of the received packet has been registered already, the processor 14 calls the header conversion routine 250 to rewrite a part of the header information of the received packet, and outputs the packet to the transmitting buffer 15T. With the conversion of the header information, the received packet can be forwarded to a destination terminal without passing through the SIP server 3. If the session of the received packet has not been registered in the connection management table 20, the processor 14 outputs the received packet to the transmitting buffer 15T without performing the header conversion.

Figure 4:
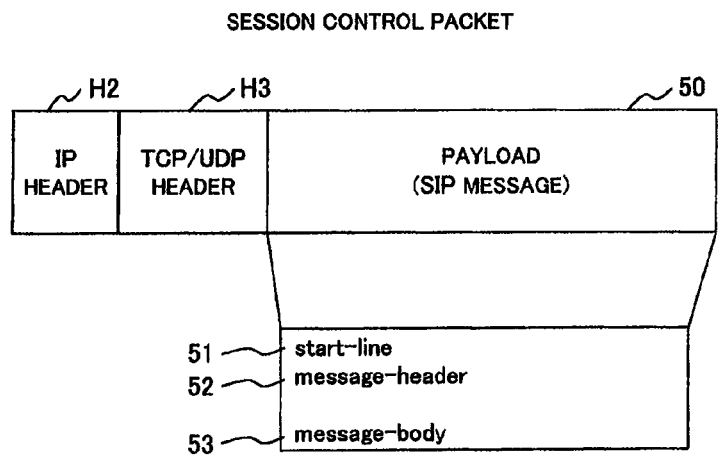
FIG. 4 is an illustration showing the format of a session control packet including an SIP message.

FIG. 4 shows the format of a session control packet including an SIP message to be communicated for session establishment/disconnection.

An SIP message 50 is carried in the payload of an IP packet having an IP header H2 and a TCP/UDP header H3. The SIP message 50 is composed of a start line 51 indicating the type and destination of the SIP message, a message header 52 including SIP parameters, and a message body 53 describing information on connection logically formed between terminals. The specific contents of the SIP message are stipulated in RFC3261.

Figure 5:
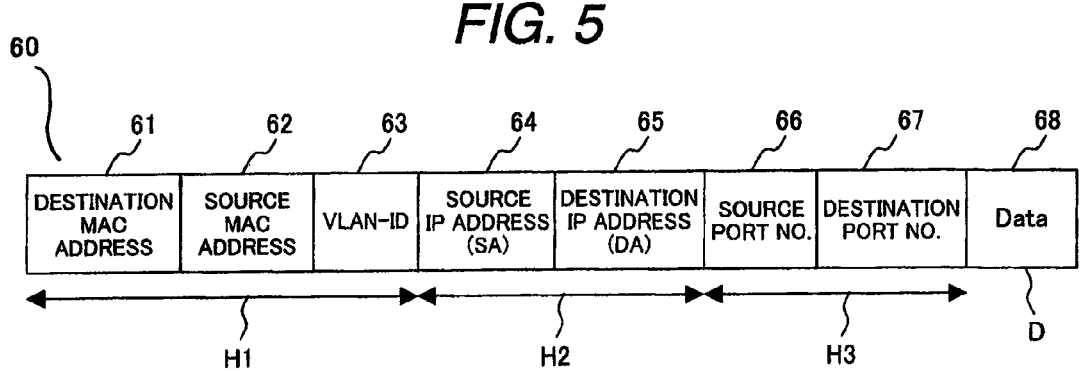
FIG. 5 is an illustration showing the format of an Ethernet frame 60 transmitted/received by the packet forwarding apparatus (L2SW) 1.

FIG. 5 shows the format of an Ethernet frame 60 to be transmitted/received by the packet forwarding apparatus (L2SW) 1.

The Ethernet frame 60 to be transmitted/received by the packet forwarding apparatus (L2SW) 1 is composed of an Ethernet header H1, an IP header H2, a TCP/UDP header H3, and a payload D consisting of data D. The Ethernet header H1 includes a destination MAC address 61, a source MAC address 62, a VLAN-ID 63, and other information items. The IP header H2 includes a source IP address 64, a destination IP address 65, and other information items. The TCP/UDP header H3 includes a source port number 66, a destination port number 67, and other information items.

FIGS. 6A and 6B show an example of the connection management table 20.

The connection management table 20 is comprised of a plurality of table entries each indicating the correspondence relationship between originating terminal information 21 and terminating terminal information 22 for each session.

The originating terminal information 21 includes an identifier (URL) 211 and an IP address 212 of a source terminal of a session establishment request message (INVITE), a port number 213 for data reception to be used by the source terminal, and device port information 214. In this embodiment, the device port information 214 is composed of an input line number 214A of an INVITE message and a VLAN-ID 214B.

On the other hand, the terminating terminal information 22 includes an IP address 221 of a source terminal of a response message (200 OK) to the session establishment request, a port number 222 for data reception to be used by the terminal, and device port information 223. In this embodiment, the device port information 223 is composed of an input line number 223A of a 200 OK packet and a VLAN-ID 223B.

FIG. 7 shows an example of the header information table 30.

The header information table 30 is comprised of a plurality of sub-tables corresponding to line numbers 31. In each sub-table, a plurality of entries indicating the correspondence relationship among a VLAN-ID 32 indicated in a session control packet, a MAC address 33 and an IP address 34 of a source terminal are registered.

Figure 8:
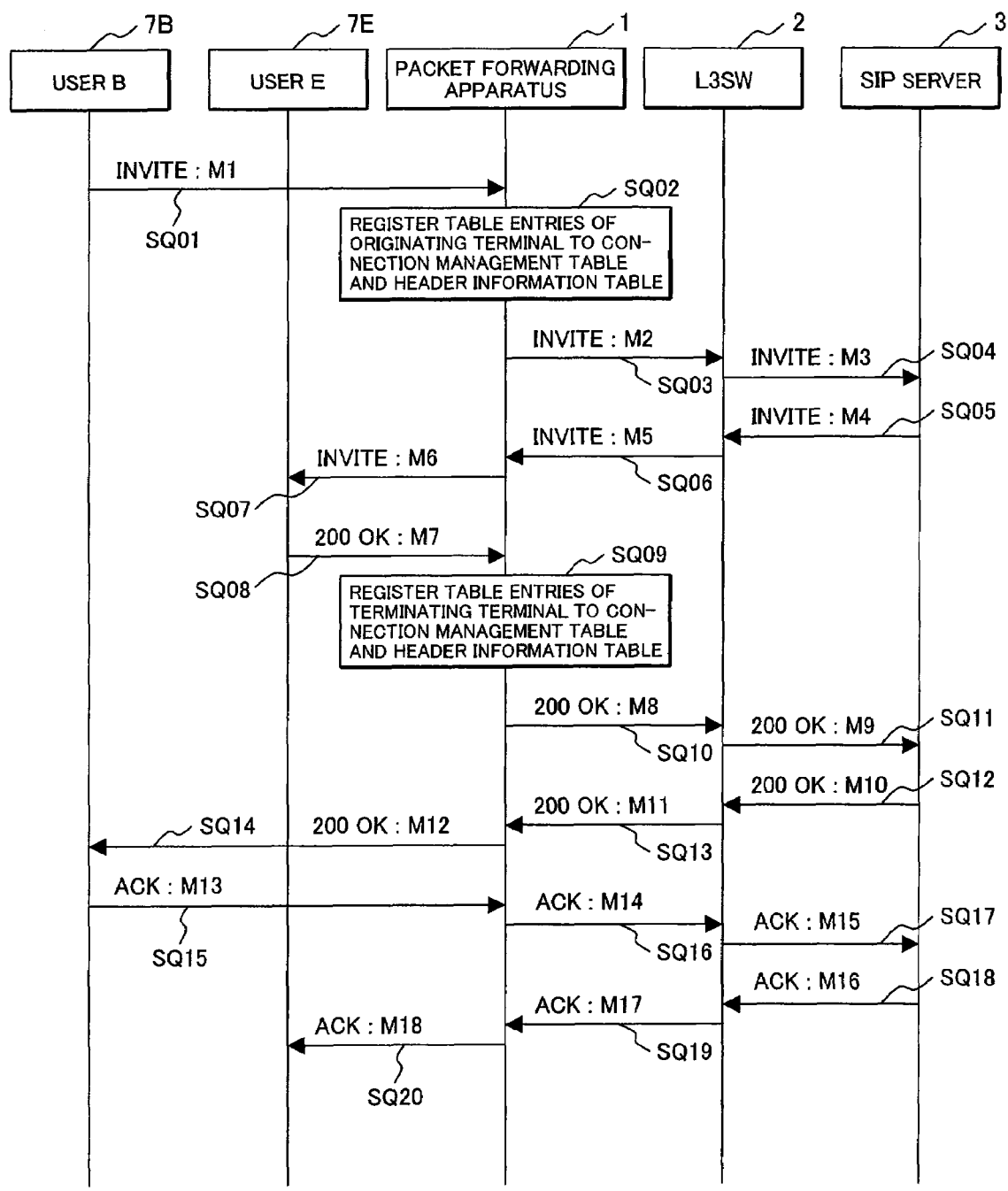
FIG. 8 is a diagram showing a communication sequence in the case where a session for VoIP communication (RTP communication) is established between an SIP terminal 7B and an SIP terminal 7E shown in FIG. 2.

FIG. 8 is a diagram showing a communication sequence in the case where the SIP terminal 7B of User B shown in FIG. 2 establishes a session for VoIP communication (RTP communication) with the SIP terminal 7E of User E through the packet forwarding apparatus (L2SW) 1, the L3SW 2, and the SIP server 3.

In this embodiment, the IP address of the SIP terminal 7B as an originating terminal is "192.168.0.1", and its URI is "UserB@aaa.com". The IP address of the SIP terminal 7E as a terminating terminal is "192.168.1.1", and its URI is "UserE@aaa.com". The IP address of the SIP server 3 is "138.85.28.1", and its URI is "aaa.com".

The originating SIP terminal 7B transmits to the SIP server 3 an INVITE packet M1 including an SIP message for a session establishment request, prior to RTP communication with the terminating SIP terminal 7E (SQ01).

As shown in FIG. 9, the INVITE packet M1 includes, in the IP header, the IP address of the SIP server 3 as a destination address (DA), the IP address of the originating SIP terminal 7B as a source address (SA), and a port number "5060" for SIP as the destination port number (UDP dst port) and source port number (UDP src port) of a UDP header. In FIG. 9, character strings following #-symbol are appended as notes, and are not valid information to be included in an actual packet. Further, although omitted in FIG. 9, the Ethernet header H1 of the INVITE packet M1 includes the MAC address of the L3SW 2 connected to the SIP server 3 as a destination MAC address, the MAC address of the originating SIP terminal 7B as a source MAC address, and the identifier value "10" of the VLAN segment for the originating SIP terminal 7B as a VLAN-ID.

The SIP message 50 transported by the INVITE packet M1 indicates the message type "INVITE" and the URL of the terminating SIP terminal 7E at the start line 51. The message header 52 of the SIP message 50 specifies the URL and port number of the originating SIP terminal 7B by the "Via" header indicative of the message route, the URL of the destination SIP terminal 7E by the "To" header indicative of the destination, the URL of the originating SIP terminal 7B by the "From" header indicative of the source, and the identifier of the session by Call-ID. Further, the message body 53 specifies, by the c parameter, the IP address of the originating SIP terminal 7B, and specifies, by the m parameter, the port number "50050" for data reception to be used by the originating SIP terminal 7B.

Upon receiving a packet from one of the first line interface units 11, the packet forwarding apparatus 1 determines from the UDP port number whether the received packet is an SIP control packet. If the received packet is an INVITE packet, the packet forwarding apparatus 1 extracts the source MAC address "00 00 00 00 00 01", the VLAN-ID ("10" in this example), and the source IP address "192.168.0.1" from the headers H1 and H2, of the received packet, respectively; extracts the identifier "UserB@aaa.com" of the requesting terminal indicated by the "From" header and the port number "50050" for data reception indicated by the m parameter from the SIP message; specifies the input line number (e.g., "1") of the packet from the identification number of the line interface unit 11; creates a new table entry which includes as the originating terminal information 21, the identifier of the requesting terminal, the source IP address, the port number for data reception, the input line number, and the VLAN-ID; and registers the entry in the connection management table 20 as shown in FIG. 6A. At this point in time, each field of the terminating terminal information 22 is blank.

The packet forwarding apparatus 1 further creates a new table entry for the SIP terminal 7B, which includes the VLAN-ID "10", the source MAC address "00 00 00 00 00 01", and the source IP address "192.168.0.1", and registers the entry in a sub-table corresponding to the line number "1" of the header information table 30 (SQ02). After that, the packet forwarding apparatus 1 forwards the received packet as an INVITE packet M2 to the L3SW 2, in accordance with the routing table 40 (SQ03). Upon receiving the INVITE packet M2, the L3SW 2 forwards the received packet as an INVITE packet M3 to the SIP server 3, in accordance with the routing table 40 (SQ04).

Upon receiving the INVITE packet M3, the SIP server 3 identifies the IP address "192.168.1.1" of the terminating SIP terminal 7E based on the destination identifier "UserE@aaa.com" indicated by the "To" header of the SIP message, and adds a new "Via" header including the URL of the server to the header of the SIP message as shown in FIG. 10. The INVITE packet M3 is transmitted as an INVITE packet M4 to the terminating SIP terminal 7E (SQ05) after rewriting its destination IP address to the IP address of the terminating SIP terminal 7E, and its source IP address to the IP address of the SIP server 3 by the SIP server 3. The INVITE packet M4 is received by the L3SW 2, and forwarded as an INVITE packet M5 to the packet forwarding apparatus 1 connected to the terminating SIP terminal 7E, in accordance with the routing table 40 (SQ06).

The INVITE packet M5 is received by the second line interface unit 11 of the packet forwarding apparatus 1. In this case, the packet forwarding apparatus 1 forwards the received packet as an INVITE packet M6 to the terminating SIP terminal 7E, in accordance with the routing table 40 (SQ07).

When the terminating SIP terminal responds to the incoming call, a 200 OK packet M7 including an SIP response message (200 OK) is transmitted from the terminating SIP terminal 7E to the SIP server 3 (SQ08). As shown in FIG. 11, the 200 OK packet M7 indicates the message type "200 OK" at the start line 51 of the SIP message, and includes in the message header 52 the same information as the INVITE packet M6. Further, the 200 OK packet M7 indicates by Cseq in the message header that this packet is a response to "INVITE", and specifies in the message body 53 the IP address "192.168.1.1" of the terminating SIP terminal 7E by the c parameter and the port number "50070" for data reception in the terminating SIP terminal 7E by the m parameter.

Upon receiving the 200 OK packet M7 through the first line interface unit, the packet forwarding apparatus 1 determines from the UDP port number "5060" that the received packet includes an SIP message. When the received packet is determined as a 200 OK packet for SIP and as a response packet to "INVITE" based on the Cseq of the message header, the packet forwarding apparatus 1 snoops, from the "From" header of the SIP message, the identifier "UserB@aaa.com" of the source terminal of the session establishment request, and checks whether a table entry including "UserB@aaa.com" as the terminal identifier 211 has already been registered in the connection management table 20.

If the objective table entry has already been registered in the connection management table 20 and its terminating terminal information 22 is blank, the packet forwarding apparatus 1 registers the IP address "192.168.1.1" of the terminating SIP terminal 7E indicated by the c parameter, the port number "50070" for data reception indicated by the m parameter, the input line number ("2" in this example) of the packet, and the VLAN-ID ("11" in this example), as the terminating terminal information 22 of the table entry, as shown in FIG. 6B.

The packet forwarding apparatus 1 further registers, in a sub-table corresponding to the line number "2" of the header information table 30 as shown in FIG. 7, a table entry including the IP address "192.168.1.1" of the terminating SIP terminal 7E, the VLAN-ID "11", and the source MAC address "00-00-00-00-01-01" extracted from the Ethernet header H1 of the received packet (SQ09). After that, the packet forwarding apparatus 1 forwards the received packet as a 200 OK packet M8 to the L3SW 2, in accordance with the routing table (SQ10). If the objective table entry has not been registered in the connection management table 20, the packet forwarding apparatus 1 forwards the received packet as the 200 OK packet M8 to the L3SW 2 without updating the tables (SQ10).

Upon receiving the 200 OK packet M8, the L3SW 2 forwards the received packet as a 200 OK packet M9 to the SIP server 3, in accordance with the routing table 40 (SQ11). Upon receiving the 200 OK packet M9, the SIP server 3 deletes the "Via" header for the SIP server 3 from the header of the SIP message, as shown in FIG. 12. Further, the SIP server 3 rewrites the destination IP address (DA) to the IP address of the SIP terminal 7B, and the source IP address to the IP address of the SIP server, and transmits the packet as a 200 OK packet M10 to the SIP terminal 7B (SQ12). The 200 OK packet M10 is received by the L3SW 2, and forwarded as a 200 OK packet M11 to the L2SW 1, in accordance with the routing table 40 (SQ13).

Upon receiving the 200 OK packet M11 through the second line interface, the packet forwarding apparatus 1 forwards the received packet as a 200 OK packet M12 to the originating SIP terminal 7B, in accordance with the routing table 40 (SQ14). In response to receiving the 200 OK packet M12, the originating SIP terminal 7B transmits an ACK packet M13 shown in FIG. 13 to the SIP server 3 (SQ15).

Upon receiving the ACK packet M13 through the first line interface unit, the packet forwarding apparatus 1 determines from the UDP port number "5060" that the received packet includes an SIP message, and judges the message type indicated by the start line of the SIP message. If the received SIP message is ACK, the packet forwarding apparatus 1 forwards the received packet as an ACK packet M14 to the L3SW 2 (SQ16). Upon receiving the ACK packet M14, the L3SW 2 forwards the packet as an ACK packet M15 to the SIP server 3, in accordance with the routing table 40 (SQ17).

Upon receiving the ACK packet M15, the SIP server 3 specifies the IP address "192.168.1.1" of the terminating SIP terminal 7E from the start line of the SIP message, and adds the "Via" header for the server to the message header as shown in FIG. 14. The SIP server 3 rewrites the destination IP address (DA) in the ACK packet M15 to the IP address of the terminating SIP terminal 7E, and the source IP address (SA) to the IP address of the SIP server 3, and transmits the packet as an ACK packet M16 to the terminating SIP terminal 7E (SQ18).

The ACK packet M16 is received by the L3SW 2, and forwarded as an ACK packet M17 to the packet forwarding apparatus 1 (SQ19). Upon receiving the SIP ACK packet M17 through the second line interface unit, the packet forwarding apparatus 1 forwards the packet as an ACK packet M18 to the terminating SIP terminal 7E (SQ20).

Figure 15:
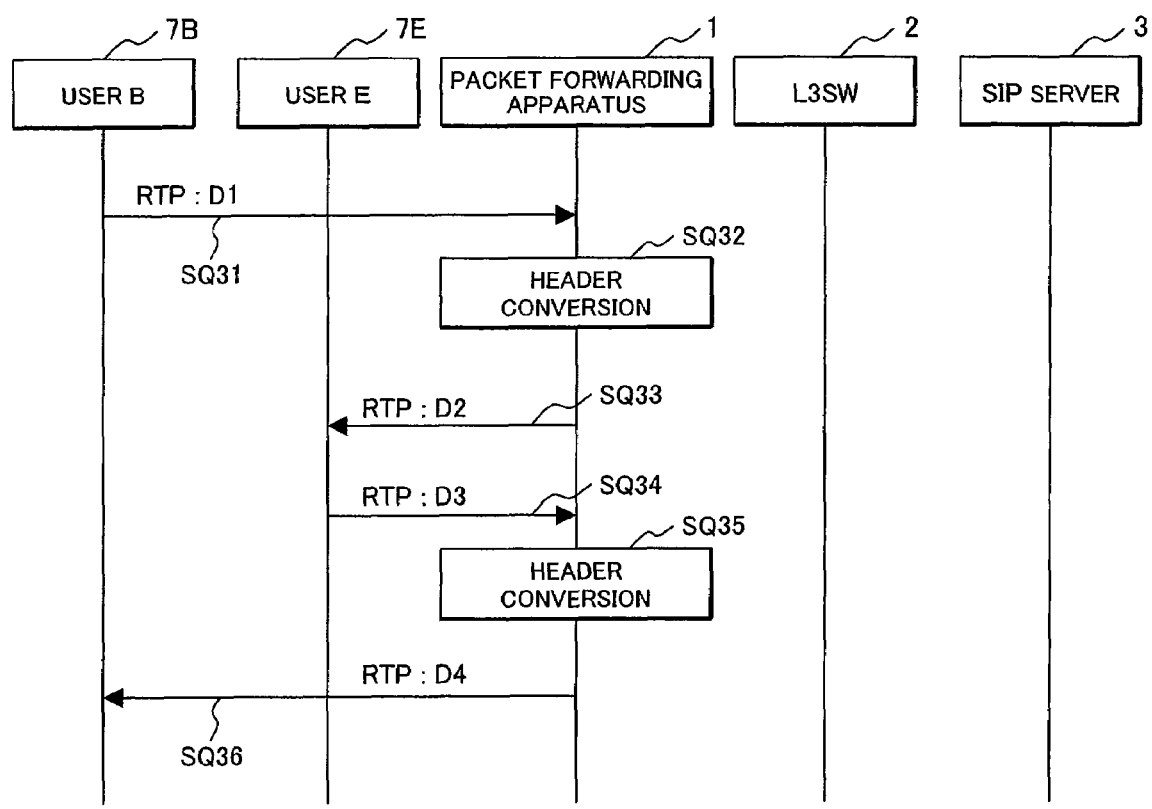
FIG. 15 shows a communication sequence for forwarding an RTP packet between the SIP terminal 7B and the SIP terminal 7E.

FIG. 15 shows a communication sequence for forwarding an RTP packet between the SIP terminal 7B and the SIP terminal 7E.

In the case where the SIP terminal 7B transmits an RTP packet D1 addressed to the SIP terminal 7E (SQ31), the RTP packet D1 includes, as shown in FIG. 16, the IP address "192.168.1.1" of the SIP terminal 7E as a destination IP address (DA), "50070" as a UDP destination port number (UDP dst port), the IP address "192.168.0.1" of the SIP terminal 7B as a source IP address (SA), and "50050" as a UDP source port number (UDP src port).

Figure 24:
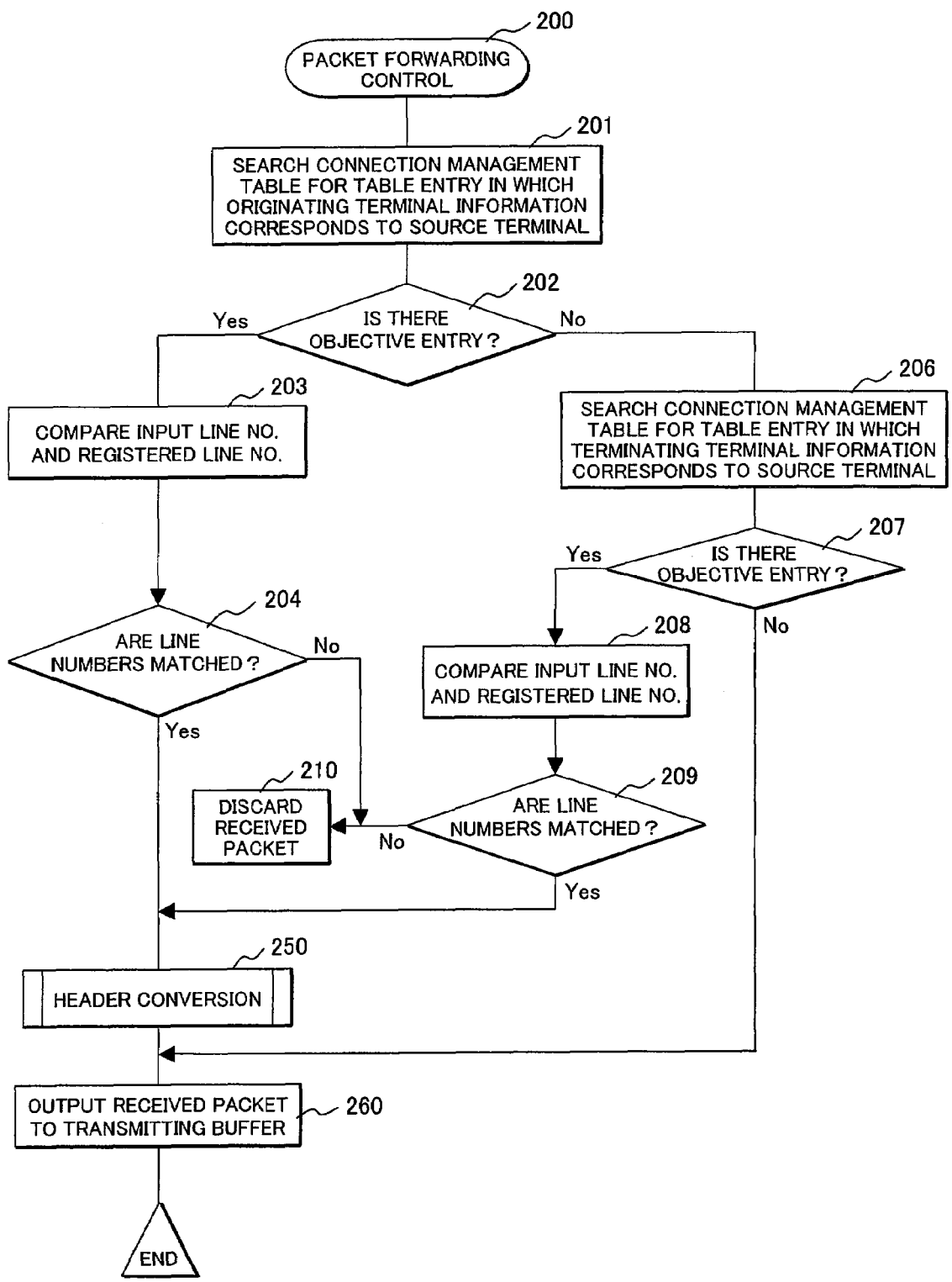
FIG. 24 is a flowchart showing an example of a packet forwarding control routine 200.

Upon receiving the RTP packet D1, the packet forwarding apparatus 1 executes a packet forwarding control routine 200 which will be detailed by referring to FIG. 24, and verifies the header information of the received packet by comparing with the connection management table 20. In this example, the source IP address "192.168.0.1" and the source port number "50050" of the RTP packet D1 match the originating terminal information 21 of the table entry EN1, and the destination IP address "192.168.1.1" and the destination port number "50070" of the RTP packet D1 match the terminating terminal information 22 of the table entry EN1. In this case, the packet forwarding apparatus 1 executes header conversion routine 250 which will be detailed by referring to FIG. 25 (SQ32) to rewrite the MAC header of the received packet D1, and forwards the packet as an RTP packet D2 to the terminating SIP terminal 7E (SQ33).

In the case where the SIP terminal 7E transmits an RTP packet D3 addressed to the SIP terminal 7B (SQ34), the RTP packet D3 includes, as shown in FIG. 17, the IP address "192.168.0.1" of the SIP terminal 7B as a destination IP address (DA), "50050" as a UDP destination port number (UDP dst port), the IP address "192.168.1.1" of the SIP terminal 7E as a source IP address (SA), and "50070" as a UDP source port number (UDP src port).

Upon receiving the RTP packet D3, the packet forwarding apparatus 1 executes the packet forwarding control routine 200, and verifies the header information of the received packet by comparing it with the connection management table 20. In this example, the source IP address "192.168.1.1" and the source port number "50070" of the RTP packet D3 match the terminating terminal information 22 of the table entry EN1, and the destination IP address "192.168.0.1" and the destination port number "50050" of the RTP packet D3 match the originating terminal information 21 of the table entry EN1. Accordingly, the packet forwarding apparatus 1 executes the header conversion routine 250 (SQ35) for packet conversion processing to rewrite the MAC header of the received packet D3, and forwards the packet as an RTP packet D4 to the SIP terminal 7B (SQ36).

Figure 18:
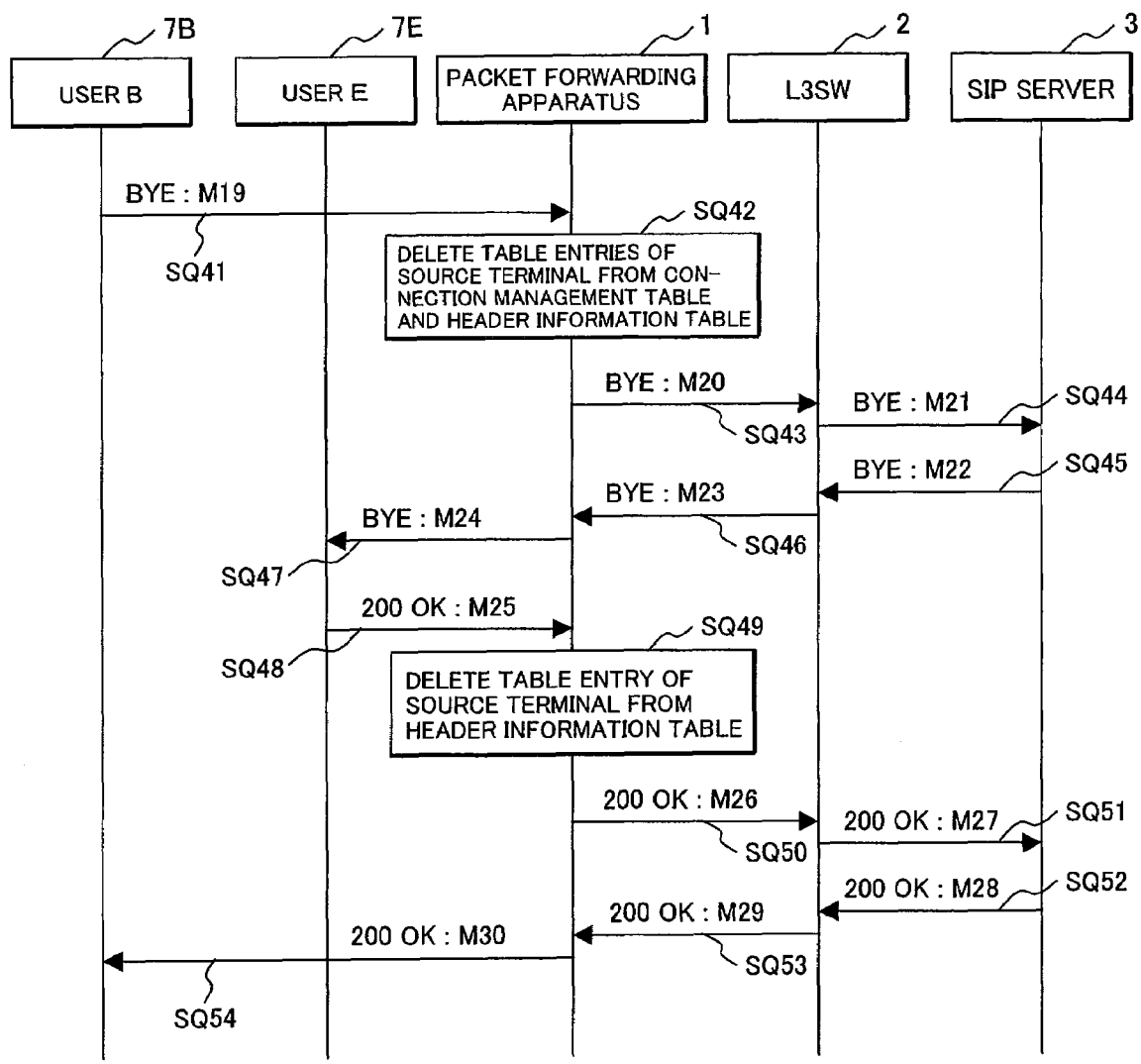
FIG. 18 shows a session disconnection sequence between the SIP terminal 7B and the SIP terminal 7E.

FIG. 18 shows a session disconnection sequence.

When the user of the originating SIP terminal 7B performs operations to disconnect a session, for example, a BYE packet M19 including an SIP message for session disconnection is transmitted from the SIP terminal 7B (SQ41). As shown in FIG. 19, the BYE packet M19 has an IP header and an UDP header similar to the ACK packet M13, and includes the message type "BYE" and the IP address "192.168.1.1" of the terminating SIP terminal 7E at the start line of the SIP message.

Upon receiving the BYE packet M19 through the first line interface unit, the packet forwarding apparatus 1 judges from the UDP port number that the received packet is an SIP control packet, and that the received packet is a BYE packet based on the start line 51 of the SIP message. The packet forwarding apparatus 1 having received the BYE packet extracts the identifier (URL) "UserB@aaa.com" of the requesting terminal from the "From" header of the SIP message, and searches the connection management table 20 for a table entry having the terminal identifier 211 of "UserB@aaa.com".

If the objective table entry EN1 was found in the connection management table 20, the packet forwarding apparatus 1 deletes the retrieved entry EN1 from the connection management table 20. Further, the packet forwarding apparatus 1 extracts the source IP address "192.168.0.1" from the header of the BYE packet, searches the header information table 30 for a table entry having the RTP IP address 34 of "192.168.0.1", and deletes the entry from the header information table 30 (SQ42). After that, the packet forwarding apparatus 1 forwards the received packet as a BYE packet M20 to the L3SW 2, in accordance with the routing table 40 (SQ43).

If the objective table entries have not been registered in the connection management table 20 and the header information table 30, the packet forwarding apparatus 1 forwards the BYE packet M20 to the L3SW 2 without updating the tables. The BYE packet M20 is received by the L3SW 2, and forwarded as a BYE packet M21 to the SIP server, in accordance with the routing table 40 (SQ44).

Upon receiving the BYE packet M21, the SIP server 3 specifies the IP address "192.168.1.1" of the terminating SIP terminal 7E from the start line of the SIP message. The SIP server 3 adds the "Via" header for the server to the SIP message header of the BYE packet M21, as shown in FIG. 20. Further, the SIP server 3 rewrites the destination IP address to the IP address of the terminating SIP terminal, and the source IP address to the IP address of the SIP server 3, and transmits the packet as a BYE packet M22 to the terminating SIP terminal 7E (SQ45).

Upon receiving the BYE packet M22, the L3SW 2 forwards the packet as a BYE packet M23 to the packet forwarding apparatus 1, in accordance with the routing table 40 (SQ46). Upon receiving the BYE packet M23 through the second line interface unit, the packet forwarding apparatus 1 forwards the received packet as a BYE packet M24 to the SIP terminal 7E, in accordance with the routing table 40 (SQ47).

The SIP terminal 7E having received the BYE packet M24 transmits a 200 OK packet M25 to the SIP server 3 (SQ48). In the 200 OK packet M25, the Cseq of the SIP message header indicates "BYE" as shown in FIG. 21.

Upon receiving the 200 OK packet M25 through the first line interface unit, the packet forwarding apparatus 1 judges that the received packet is an SIP message because the UDP port number is "5060", that the received message is a 200 OK message based on the start line 51 of the SIP message, and that the received packet is a response packet to the BYE packet based on the Cseq of the message header.

If the 200 OK packet is a response packet to the BYE packet, the packet forwarding apparatus 1 extracts the source IP address "192.168.1.1" from the header of the received packet, searches the header information table 30 for a table entry having the RTP IP address 34 of "192.168.1.1", and deletes the entry from the header information table 30 (SQ49). After that, the packet forwarding apparatus 1 forwards the received packet as a 200 OK packet M26 to the L3SW 2, in accordance with the routing table 40 (SQ50). Upon receiving the 200 OK packet M26, the L3SW 2 forwards the packet as a 200 OK packet M27 to the SIP server 3, in accordance with the routing table 40 (SQ51).

The SIP server 3 having received the 200 OK packet M27 checks the Cseq of the message header. If the received packet is judged as a response packet to the BYE packet, the SIP server 3 deletes the "Via" header for the SIP server 3 from the message header, as shown in FIG. 22, rewrites the destination IP address (DA) and the source IP address to the IP address of the SIP terminal 7B and the IP address of the SIP server, respectively, and transmits the packet as a 200 OK packet M28 to the SIP terminal 7B (SQ52). Upon receiving the 200 OK packet M28, the L3SW 2 forwards the received packet as a 200 OK packet M29 to the packet forwarding apparatus 1, in accordance with the routing table 40 (SQ53).

Upon receiving the 200 OK packet M29 through the second line interface unit, the packet forwarding apparatus 1 forwards the received packet as a 200 OK packet M30 to the SIP terminal 7B, in accordance with the routing table 40 (SQ54). When the SIP terminal 7B receives the 200 OK packet M30, the sequence of disconnecting the session is completed.

Figure 23:
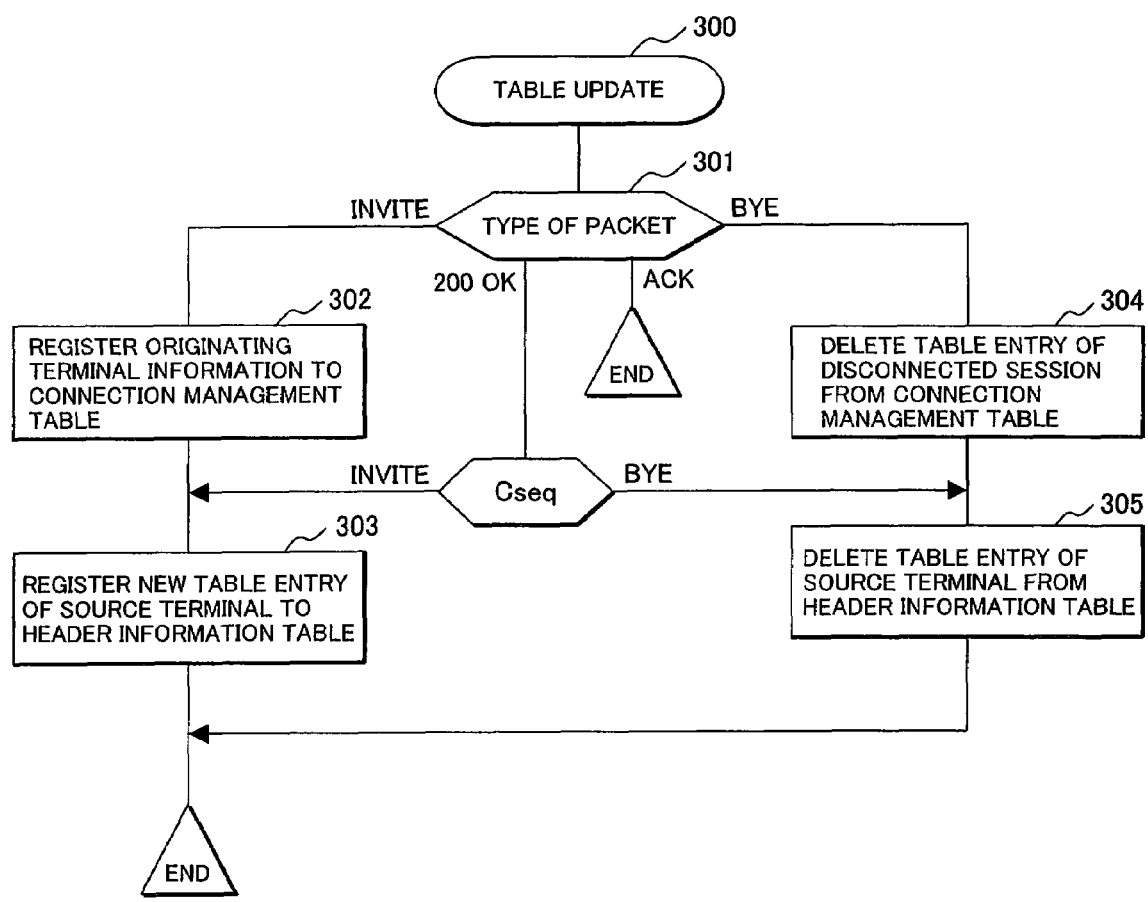
FIG. 23 is a flowchart showing an example of a table update routine 300.

FIG. 23 shows a flowchart of the table update routine 300.

In the table update routine 300, the processor 14 determines the type of the received packet (step 301). If the received packet is an INVITE packet, the processor 14 registers in the connection management table 20 a new table entry including valid data for the originating terminal information 21 and blanks in the fields of the terminating terminal information 22 (step 302), registers in the header information table 30 a new table entry indicating the VLAN-ID of the received packet and the MAC address and IP address of the source terminal (303), and ends this table update routine.

If the received packet is a BYE packet, the processor 14 deletes from the connection management table 20 a table entry corresponding to a disconnected session (304), deletes from the header information table 30 a table entry corresponding to the IP address of the source terminal of the received packet (305), and ends this table update routine.

If the received packet is a 200 OK packet, the processor 14 refers to the Cseq of the SIP message. If the Cseq indicates "INVITE", the processor 14 registers in the header information table 30 a new table entry indicating the VLAN-ID of the received packet and the MAC address and IP address of the source terminal (303). If the Cseq indicates "BYE", the processor 14 deletes from the header information table 30 a table entry corresponding to the IP address of the source terminal of the received packet (305). After performing steps 303 and 305, the processor 14 ends this table update routine. If the received packet is an ACK packet, the processor 14 ends this table update routine without performing anything.

FIG. 24 shows a flowchart of the packet forwarding control routine 200 for processing an RTP packet.

In the packet forwarding control routine 200, the processor 14 first searches the connection management table 20 for a table entry corresponding to the received packet, assuming that the source terminal of the received packet is the originating terminal (step 201). In step 201, the processor 14 retrieves from the connection management table 20 a table entry in which the IP address 212 and the port number 213 matched with the source IP address and the source port number of the received packet are registered as the originating terminal information 21 and the IP address 221 and the port number 222 matched with the destination IP address and the destination port number of the received packet are registered as the terminating terminal information 22.

When the objective table entry was found as a result of table search (202), the processor 14 compares the input line number of the received packet and the line number 214A indicated in the table entry (203). If the line numbers match to each other, the processor 14 outputs the received packet to the transmitting buffer 15T after executing the header conversion routine 250 (also step 250) (260). If the line numbers do not match, the processor 14 discards the received packet (210).

When the objective table entry was not found in the table search of step 201, the processor 14 searches the connection management table 20 for a table entry corresponding to the received packet, assuming that the source terminal of the received packet is the terminating terminal (step 206). In step 206, the processor 14 retrieves from the connection management table 20 a table entry in which the IP address 221 and the port number 222 matched with the source IP address and the source port number of the received packet are registered as the terminating terminal information 22 and the IP address 212 and the port number 213 matched with the destination IP address and the destination port number of the received packet are registered as the originating terminal information 21.

When the objective table entry was found as a result of table search (207), the processor 14 compares the input line number of the received packet and the line number 223A indicated in the table entry (208). If the line numbers match each other, the processor 14 outputs the received packet to the transmitting buffer 15T after executing the header conversion routine 250 (260). If the line numbers do not match, the processor 14 discards the received packet (210). If the objective table entry was not found in the table search of step 206, the processor 14 outputs the received packet to the transmitting buffer 15T without executing the header conversion.

Figure 25:
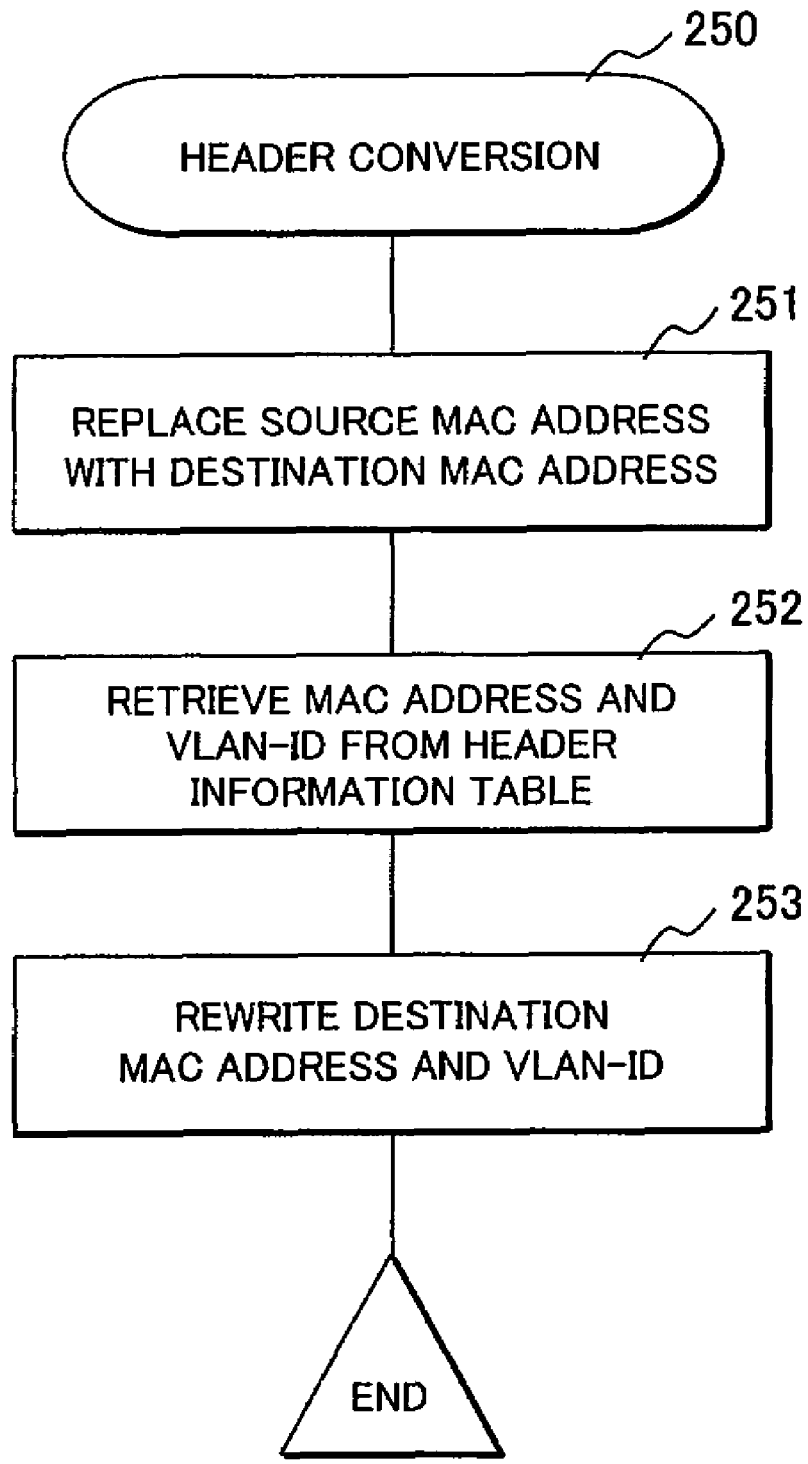
FIG. 25 is a flowchart showing an example of a header conversion routine 250.

FIG. 25 shows a flowchart of the header conversion routine 250.

In the header conversion routine 250, the processor 14 replaces the source MAC address of the received packet (RTP packet) with the destination MAC address (251). Then, the processor 14 searches the header information table 30 for a table entry having the RTP IP address 34 matched with the destination IP address of the received packet to obtain the values of MAC address 33 and VLAN-ID 32 (252), and rewrites the destination MAC address and VLAN-ID of the received packet to the MAC address and VLAN-ID thus obtained (253).

In the embodiment, the routing unit 12 selects session control packets and RTP packets from among packets received by the first line interface units each accommodating the connection line (access line) for the terminals and supplies the selected packets to the control unit 13. Further, the routing unit 12 routes a packet having been received by the second line interface unit accommodating the connection line for the L3SW 2, in accordance with the routing table 40 without passing it to the control unit 13.

However, as another embodiment of the invention, for example, the routing unit 12 may supply all session control packets and RTP packets together with input line numbers to the control unit 13, so that the control unit 13 judges the input lines of these packets and selects the control packets to be reflected in the connection management table and the header information table and the RTP packets to be header-converted.

Alternatively, instead of judging the input line number, the control unit may check the connection management table and the header information table, for example, when an INVITE packet (or 200 OK packet) was received, so that the control unit adds a new table entry to each table if a table entry to be registered in accordance with the received packet was not found in the table. If the entry to be registered exists in the tables, the processor unit may judge that the received packet was sent back by the SIP server 3, and route the received packet without updating the tables.

In the case where voice communication is performed between an originating terminal connected to the Internet NW3 and a terminal accommodated by the packet forwarding apparatus (L2SW) 1, there is no need for the packet forwarding apparatus 1 to send back RTP packets. In this case, an INVITE packet is necessarily received by the second line interface unit, and a 200 OK packet responding thereto is necessarily received by one of the first line interface units. Accordingly, the packet forwarding apparatus 1 does not receive the INVITE packet or the 200 OK packet sent back by the SIP server 3.

As described above, if the connection management table is updated by targeting only session control packets received by the first line interface units, the originating terminal information is not registered in the connection management table. Therefore, by checking the connection management table at the time of receiving a 200 OK packet, the packet forwarding apparatus 1 can forward the received packet to the L3SW 2 without updating the tables. Further, since the session has not been registered in the connection management table, an RTP packet received thereafter by the first line interface units can be forwarded to the L3SW 2 without sending it back by the packet forwarding apparatus 1.

In the case as well where a terminating terminal is connected to the Internet NW3, by updating the connection management table depending only on session control packets having been received by the first line interface units, the terminating terminal information can be prevented from registering in the connection management table. Thus, for the reason that the session has not been registered in the connection management table, it is able to forward RTP packets received thereafter by the first line interface units to the L3SW 2 without sending them back by the packet forwarding apparatus 1.

As described above, in the embodiment of the invention, because the packet forwarding apparatus 1 stores information necessary for the header conversion of an RTP packet in the header information table during execution of a session establishment procedure between terminals, forwards session control packets to the session management apparatus (SIP server), and forwards RTP packets to a destination terminal without passing them through the session management apparatus, it is able to reduce the load on the session management apparatus and shorten the transfer delay time of RTP packets. Further, since all control packets for session establishment/disconnection are forwarded to the session management apparatus, the session management server can collect session management information for each user without a hitch. The invention is also effective for an aggregation type network in which a plurality of VLANs are unified into one VLAN between the L2SW and the L3SW.

What is claimed is:

1. A layer 2 packet forwarding apparatus for connecting a plurality of virtual local area network (VLAN) segments and routing received packets in accordance with layer 2 header information of each of the received packets, the layer 2 header information including a VLAN-ID, the layer 2 packet forwarding apparatus comprising:

a plurality of first line interface units for accommodating access lines of said VLAN segments each connected to at least one user terminal;

a second line interface unit for connecting the packet forwarding apparatus to a higher-level communication node connected to a communication network including a session management apparatus; and a protocol processing unit for routing the received packets among said first and second line interface units in accordance with layer 2 header information of each of the received packets and detecting a first control packet of SIP for requesting a session establishment from among the received packets, wherein a table update routine by the protocol processing unit is executed if the first control packet is received and then the first control packet is forwarded to the session management apparatus, wherein said protocol processing unit includes:

a connection management table in which a plurality of table entries each indicating a correspondence relationship between originating terminal information and terminating terminal information for each session are registered, said originating terminal information including a source port number, an IP address, and an identifier of an originating user terminal, and said terminating terminal information including a source port number and an IP address of a terminating user terminal;

a header information table in which a plurality of table entries each indicating, in association with a line number, a combination of a VLAN-ID, a MAC address, and an IP address are registered; and a control unit, wherein said control unit operates, when the first control packet is received from one of said first line interface units, to route the first control packet to said session management apparatus through said second line interface unit after executing the table update routine by registering to said connection management table a new table entry of an originating terminal information of the original user terminal which transmits the first control packet, including a source port number, an IP address, and an identifier extracted by snooping a SIP message included in the first control packet, and registering to said header information table a new table entry of the originating user terminal, including a VLAN-ID, a source MAC address, and a source IP address of the original user terminal which transmits the first control packet, in association with a line number of the first line interface unit having received the first control packet, wherein the control unit operates, when a second control packet of SIP to be transmitted to said session management apparatus is received from one of said first line interface units as a response packet of the first control packet, to route the second control packet to said session management apparatus through said second line interface unit after executing the table update routine by searching whether the originating terminal information extracted by snooping a SIP message included in the second control packet has been registered in the connection management table or not, and if the originating terminal information has been registered, registering the port number and the IP address of the source terminal which transmits the second control packet as the terminating terminal information into the new table entry registered in the connection management table, and registering to said header information table a new table entry for said terminating user terminal, including a VLAN-ID, a source MAC address, and a source IP address used by the source terminal which transmits the second control packet, in association with an input line number of the second line interface unit which receives the second control packet, and wherein said control unit operates, when a real-time packet transmitted after a session has been established between said originating user terminal and said terminating user terminal is received from one of said first line interface units, to compare header information of the received real-time packet with the originating terminal information and the terminating terminal information registered in said connection management table, and if a table entry corresponding to the header information has been registered in said connection management table as a result of executing the table update routine, the control unit routes the received real-time packet to the first line interface unit corresponding to a destination terminal of the received real-time packet without passing the real-time packet to said higher-level communication node connected to said second line interface, after rewriting the VLAN-ID, and the destination MAC address of the received real-time packet based on the contents of a table entry corresponding to the destination IP address of the real-time packet searched from said header information table, and if a table entry corresponding to the header information has not been registered in said connection management table as a result of executing the table update routine, the control unit routes the received real-time packet to the second line interface unit so that the real-time packet is processed by said higher-level communication node.

2. The layer 2 packet forwarding apparatus according to claim 1,
wherein said connection management table further includes an input line number and a VLAN-ID of said session establishment request packet as said originating terminal information, and includes an input line number and a VLAN-ID of said response packet as said terminating terminal information.

3. The layer 2 packet forwarding apparatus according to claim 1,
wherein said control unit operates, when a session disconnection request packet is received through one of said first line interface units, to delete from said connection management table a table entry corresponding to a session on which disconnection was requested, and deletes from said header information table a table entry for an originating user terminal and a table entry for a terminating user terminal, each of which is identified by header information of the disconnection request packet.

4. The layer 2 packet forwarding apparatus according to claim 1,
wherein said protocol processing unit includes a routing unit for routing received packets among said first and second line interface units, and
wherein said routing unit supplies said specific session control packets and said real-time packets received from said first line interface units to said control unit, and routes each of specific session control packets and real-time packets outputted from said control unit to one of said first and second line interfaces in accordance with the header information of the packets.

5. The layer 2 packet forwarding apparatus according to claim 1,
wherein said protocol processing unit includes a routing unit for routing received packets among said first and second line interface units, and
wherein said routing unit supplies specific session control packets and real-time packets received from said first and second line interface units to said control unit, and routes each of the specific session control packets and real-time packets outputted from the control unit to one of said first and second line interfaces in accordance with the header information of the packet.

* * * * *